United States Patent Office 3,681,268
Patented Aug. 1, 1972

3,681,268
MASTIC ADHESIVE COMPOSITION CONTAINING ZINC SALT OF FORMALDEHYDE-MODIFIED ROSIN
Albert R. Bunk, Columbus, Bailey Bennett, Worthington, and David A. Berry, Columbus, Ohio, and Noah J. Halbrook, Walter H. Schuller, and Ray V. Lawrence, Lake City, Fla., assignors to the United States of America as represented by the Secretary of Agriculture
No Drawing. Filed Feb. 27, 1970, Ser. No. 15,235
Int. Cl. C08d 9/12; C08h 11/06; C08f 47/24
U.S. Cl. 260—2.3
5 Claims

ABSTRACT OF THE DISCLOSURE

Mastic adhesive compositions having excellent properties for adhesive applications in the building trades industry, which compositions comprise relative proportions by weight of: 100 parts of a rubber selected from the group consisting of reclaim, natural, styrene-butadiene rubbers; 50 to 200 parts by weight of a zinc salt of the formaldehyde-modified rosin from reacting 2 to 10 parts by weight of formaldehyde with 100 parts by weight of molten rosin, which zinc salt of formaldehyde-modified rosin has a B & R softening point between 95° and 150° C.; and a hydrocarbon vehicle for the rubber.

A non-exclusive, irrevocable, royalty-free license in the invention herein described, throughout the world for all purposes of the United States Government, with the power to grant sublicenses for such purposes, is hereby granted to the Government of the United States of America.

DISCLOSURE

This invention relates to a mastic adhesive composition. More particularly, the invention concerns a mastic adhesive composition containing a zinc salt of formaldehyde-modified rosin and a rubber selected from the group consisting of reclaim, natural, and styrene-butadiene rubbers.

Mastic adhesive compositions are special types of adhesives which are thick and buttery in consistency and are characterized by their extremely high viscosity. Most mastic compositions contain natural, SBR, or reclaim rubber or blends of these. They may be either latex- or solvent-based. Tackifiers and fillers are widely included therein. These mastic adhesive compositions are used in volume and principally in low-strength adhesive applications. For adhesive applications, the composition is applied generally by means of a spatula, notched-trowel, or pressure gun as a coating onto and usually to both surfaces to be bonded. After drying of the coatings, a contact bond is made. They are useful for adhering floor and wall tile, floor coverings, decorative plastic counter tops, ceiling tile and panels, and in like adhesive applications in the building trades industry. Of importance for their utility is that the mastic adhesive composition possess special properties. The mastic composition needs to possess a reasonable open or application time, an adequate green tack strength upon contact, and good aging properties, such as retention of its bond strength for a long period. Other desirable properties are adequate lap-shear strength and resistance to static load at an elevated temperature.

Heretofore numerous mastic adhesive compositions have been known. Likewise a number of rosin-derived materials have been used as components in some mastic compositions, such as illustrated by a six-part mastic composition, taught in U.S. Pat. No. 2,985,606, of which one component is a rosin ester and another is a zinc salt of rosin acids. However, even though a number of useful mastic compositions are known, there has continued to be a need for alternative and new and improved mastic compositions containing other rosin-derived materials to provide a selection of mastic compositions offering equivalent and/or improved properties. It is to fulfilling those needs of the prior art that the present invention is directed.

The mastic adhesive compositions of the invention comprise relative proportions by weight of: 100 parts of a rubber selected from the group consisting of natural, styrene-butadiene (i.e., SBR), and reclaim rubbers; 50 to 200 parts by weight of a zinc salt of formaldehyde-modified rosin; and a hydrocarbon vehicle in an amount dispersing the rubber and providing the composition with a solids content between 40 and 80 percent.

In common with previous mastic adhesive compositions, the mastic compositions of the invention contain a rubber component and a hydrocarbon vehicle for the rubber component. They also may contain, and generally do contain, additional conventional constituents such as fillers, reinforcing agents, rubber antioxidants, and the like. The rubber component imparts body, stability, and some tack to the entire composition, but fails to provide adequate tack properties for the compositions unless another tackifying constituent is included.

Each rubber useful for the rubber component in the compositions of the invention is known. Natural rubber is obtained from the rubber tree, Hevea brasiliensis, and is a cis-1,4-polyisoprene containing approximately 5000 isoprene units in a polymer chain. Styrene-butadiene rubber (frequently designated SBR rubber) is a synthetic elastomeric copolymer resulting from emulsion copolymerization of butadiene and styrene in varying ratios, most commonly in a ratio of 70 to 80 parts of butadiene to 30 to 20 parts by styrene, with both cold (i.e., polymerized at about 40° F.) and hot (i.e., polymerized at about 122° F.) type SBR rubbers commercially available. Reclaim rubber in general is the rubber product resulting from treatment of vulcanized scrap rubber tires, tubes and miscellaneous waste rubber articles by the application of heat and chemical agents thereto, whereby a substantial "devulcanization" or regeneration of the rubber compound to its original plastic state is effected. The reclaiming is essentially a depolymerization with combined sulfur, fillers, and like constituents present in the vulcanized rubber not being removed and generally continuing to be found in the reclaimed rubber. Whether the reclaim rubber is classified by its reclaiming process or by the nature of the rubber therein and/or type of scrap reclaimed, that reclaim rubber is useful in the mastic compositions of the invention even through the scrap product from which it was derived was a different vulcanized rubber than a natural or styrene-butadiene vulcanized rubber.

A vehicle for the particularly employed rubber component is included in the mastic composition. The vehicle can be any of the known hydrocarbon vehicles for the rubber such as naphtha fractions or other liquid hydrocarbon fractions, particularly those boiling in the range of 140°–215° F. The solvent is included in an amount to provide a mastic composition of a solids content between about 40 and 80 percent by weight. Generally, the solvent is included in an amount between 150 to 400 parts by weight per hundred parts of the rubber, and preferably is included in an amount between 200 and 350 phr. of the rubber. The amount also is chosen so as to provide a mastic composition of desirable and requisite viscosity for the particular mastic adherence application in mind.

Generally and desirably the mastic composition also includes inorganic fillers to lower its overall cost without appreciable detriment to its physical properties. Useful inorganic fillers include calcium carbonate, clays, and particularly kaolin clays, finely divided silicon dioxide, carbon black, inorganic fibers such as asbestos fibers, and the like conventional fillers. The fillers may amount to up to 500 parts by weight for each 100 parts by weight of the rubber. Inclusion of larger amounts of filler detrimentally effect the strength of the mastic composition. Generally and preferably the filler is included in an amount between 150 to 400 parts by weight for each 100 parts by weight of the rubber.

Generally the mastic composition also includes, and also in conventional amounts, various other constituents conventionally included in known mastic compositions for purposes such as rubber antioxidants, and the like.

The mastic adhesive composition of the invention, for each 100 parts by weight of its rubber component, contains from 50 to 200 parts by weight of a zinc salt of formaldehyde-modified rosin. This zinc resinate functions to provide the composition with adequate adhesive tack. Preferably the zinc resinate is included in an amount between 100 and 175 parts by weight for each 100 parts by weight of the rubber component. In general the included zinc resinate has a softening point (B&R) between 95° and 150° C. and is of a USDA rosin color grade between N to E inclusive, and is the salt of from about 5 to 10 parts by weight of zinc and the formaldehyde-modified rosin obtained upon reacting 2 to 10 parts by weight of formaldehyde with 100 parts by weight of molten rosin. This zinc resinate will be more fully understood from a description thereof in U.S. Pat. 2,572,071 (Oct. 23, 1951) by W. E. St. Clair et al., and in "Fused Zinc Resinates From Aldehyde-Modified Rosin" by W. E. St. Clair et al. (Ind. & Eng. Chem., 44, 349–351, [1952]), and the several illustrative preparations thereof which follow.

ILLUSTRATIVE PREPARATIONS OF ZINC SALT OF FORMALDEHYDE-MODIFIED ROSIN

Example A

About 100 grams of small lumps of WW gum rosin of Acid No. 165 are placed in a 3-neck, round-bottom, distilling flask, equipped with a stirrer, a thermometer in a gas-inlet arm for nitrogen or carbon dioxide, and a side-arm Dean-Stark type trap with condenser. Five grams of paraformaldehyde (95 percent purity), (i.e., about 5 phr. of the rosin) in powder or flake form then are added and dispersed by stirring with the lumps of unheated rosin. Nitrogen gas is introduced and the mixture, under mild nitrogen gas cover and with slow stirring, is heated to about 90°–100° C. to melt the rosin. The temperature is gradually increased to 170° C. during the next hour so as to avoid any appreciable loss of the formaldehyde and to react all formaldehyde with the rosin. At this process stage, the resulting intermediate product is about a 5-percent-formaldehyde-modified rosin.

This 5 percent-formaldehyde-modified rosin is heated slowly with stirring to 250° C. and addition of zinc oxide powder initiated. Zinc oxide powder in incremental 1/10 portions of the total amount thereof being used is added each half hour and allowed to react with no significant aggregate formation being noted until a total of 10 grams of zinc oxide powder, i.e., about 10 phr. of the rosin, have been added. A slight exotherm raising the temperature several degrees is noted upon the first incremental addition. However, additional heat also is supplied so as to have the stirred mixture at about 250°–265° C. for subsequent incremental additions. Heating and stirring then are continued at about 260° C. for an additional two hours with the temperature during this latter hour being raised to 275° C. if no gelling is observed. Should signs of gelling or aggregate formation be noted, an addition of about 2 percent by weight (based on the weight of rosin) of glacial acetic acid usually will clear up the reaction. When the material in the flask looks clear and a cool sample "pill" taken therefrom remains clear and brittle, the resulting product of a fused zinc salt of formaldehyde-modified rosin is poured and cooled. Typical properties of the zinc resinate are: USDA rosin color grades N to E; softening point (B & R) 136° C.

Example B

Example A is repeated with the exception that there are used only 5 grams of zinc oxide (i.e., 5 phr. of the rosin). The resulting zinc resinate has a color grade of 1 (U.S. Rosin Standard) and a B & R softening point of 103° C.

Example C

Example A is repeated with the exception that only 7 grams of zinc oxide are used (i.e., 7 phr. of the rosin). The resulting zinc resinate has a color grade of 1 (U.S. Rosin Standard) and a B & R softening point of 119° C.

Example D

Example A is repeated with the exception that only 2 grams of paraformaldehyde (i.e., 2 phr. of the rosin) and 7 grams of zinc oxide are used (i.e., 7 phr. of the rosin). The resulting zinc resinate has a color grade of K (U.S. Rosin Standard) and a B & R softening point of 105° C.

Example E

Example A is repeated with the exception that 10 grams of paraformaldehyde (i.e., 10 phr. of the rosin) and 10 grams of zinc oxide are used (i.e., 10 phr. of the rosin). The resulting zinc resinate has a color grade of M (U.S. Rosin Standard) and a B & R softening point of 145° C.

The term "rosin" as used herein is intended to include wood rosin, tall-oil rosin, and other natural resins containing a substantial content of rosin acids and each of these may be employed to prepare a useful zinc salt of formaldehyde-modified rosin. The term "formaldehyde" as used herein is intended to encompass formaldehyde per se as well as paraformaldehyde and metaformaldehyde with each useful to prepare a useful zinc salt of formaldehyde-modified rosin. The amount of formaldehyde employed should be between about 2 and 10 parts by weight of formaldehyde for each 100 parts of the rosin. Somewhat greater amounts of formaldehyde may be used, but are unnecessary. The maximum useful amount of zinc reactant approximates the stoichiometric amount of zinc to react with the free carboxyl groups available in the rosin acids present in the rosin. Generally a smaller amount is used and usually there are used an amount of zinc oxide between 5 and 10 parts by weight, inclusive, for each 100 parts by weight of the formaldehyde-modified rosin.

The following formulations present illustrative embodiments of mastic adhesive compositions of the invention. In preparing these illustrative formulations, there is used a Bramley Beken duplex mixer which can be heated using steam and cooled using cold water. Its mixing blades are driven by a variable-speed motor drive adjustable to provide 16.5 and 84 r.p.m.

Formulations 1, 2, and 3.—The following formulations are prepared in which the rubber component therein is smoked sheet natural rubber:

|  | 1 | 2 | 3 |
| --- | --- | --- | --- |
| Parts by weight of zinc resinate per 100 parts by weight of rubber | 150 | 175 | 200 |
| Ingredients, parts by weight: | | | |
| Smoked sheet natural rubber | 9.53 | 9.21 | 8.83 |
| Zinc salt of formaldehyde-modified rosin (Ex. A) | 14.53 | 16.16 | 18.09 |
| Filler: | | | |
| Kaolin clay (s.q. 2.6, −300 mesh) such as Dixie Clay | 19.07 | 18.38 | 17.6 |
| Precipitated calcium carbonate, fine particle size, such as Calcene TM | 19.06 | 18.38 | 17.68 |
| Asbestos fiber, such as Asbestos 7T06 | 3.82 | 3.69 | 3.55 |
| Rubber antioxidant: phenyl beta naphthylamine | 0.19 | 0.18 | 0.17 |
| Rubber vehicle: | | | |
| Toluene | 15.30 | 15.30 | 15.30 |
| n-Hexane | 18.70 | 18.70 | 18.70 |

In preparing formulations 1, 2, and 3, the mixer is heated to 200° F. The zinc resinate is added and allowed to melt before mixing the rubber therewith. With highmelting-point zinc resinates, the mill is run at about 33 r.p.m. to break up the resinate. After 15 minutes mixing, the natural rubber is added and allowed to masticate for 15 minutes at 50 r.p.m. The mill is cooled to 180° F. and the clay filler added to the batch slowly with some toluene added as needed. The balance of the toluene then is added and the mill cooled to 140° F. Next, the calcium carbonate filler and the antioxidants are added slowly. Mill speed is increased to 67 r.p.m. and, after 10 minutes mixing, the asbestos filler added. The mill then is cooled to 100° F.; mill speed adjusted to 84 r.p.m.; the n-hexane added; and mixing continued for 10 minutes. At this time a small sample of the batch is taken and a solids determination is made rapidly thereof. Additional rubber vehicle then is added, if necessary, to provide a formulation approximating 66 percent solids content.

Formulations 4, 5, and 6.—The following formulations are prepared in which the rubber component therein is a styrene-butadiene rubber, whose bound styrene content is 30 percent and whose Mooney Viscosity is 160 and which had been prepared with a rosin acid emulsifier at about 122 F. emulsification temperature from styrene, butadiene, and a small amount of a crosslinking monomer, such as the SBR rubber, Ameripol 4503 (Goodrich-Gulf Chemicals, Inc.).

|  | 4 | 5 | 6 |
|---|---|---|---|
| Parts by weight of zinc resinate per 100 parts by weight of rubber | 125 | 150 | 175 |
| Ingredients, parts by weight: | | | |
| SBR rubber | 12.96 | 12.22 | 11.60 |
| Zinc salt of formaldehyde-modified rosin (Ex. A) | 16.21 | 18.37 | 20.33 |
| Filler: | | | |
| Kaolin clay (s.g. 2.6, −300 mesh) such as Dixie Clay | 14.59 | 13.75 | 12.97 |
| Precipitated calcium carbonate, fine particle size, such as Calcene TM | 4.86 | 4.59 | 4.32 |
| Asbestos fiber, such as Asbestos 7T06 | 5.20 | 4.90 | 4.62 |
| Rubber antioxidant: phenyl beta naphthylamine | 0.18 | 0.17 | 0.16 |
| Rubber vehicle: | | | |
| Toluene | 20.70 | 20.70 | 20.70 |
| n-Hexane | 25.30 | 25.30 | 25.30 |

In preparing formulations 4, 5, and 6, the mixer is heated to 200° F. The zinc resinate is added and allowed to melt and break up at a mill speed of 33 r.p.m. After about 10 minutes of mixing, the SBR rubber in crumb form is added and the mill speed is increased to 84 r.p.m. After about ten minutes more of mixing, the clay filler is added slowly with the mill speed decreased to 50 r.p.m. and mill temperature decreased to 140° F. Toluene is added as necesary during this clay addition. After addition of the clay, the remainder of the toluene is added. Next the calcium carbonate filler, rubber antioxidant, and asbestos fibers are added slowly. Mill temperature is decreased to 100° F. Some of the n-hexane also is added along with the fillers. Mill speed is increased to 84 r.p.m. after addition of all of the filler, and the remainder of the n-hexane is added. After 10 minutes more of mixing a small sample of the batch is taken and a solids determination is made rapidly thereof. Additional rubber vehicle is added, if necessary, to provide a formulation approximating 54 percent solids content.

Formulations 7, 8, and 9.—The following formulations are prepared in which the rubber component therein is a reclaim rubber from gray carcass scrap, which reclaim rubber contained about 66 percent rubber hydrocarbons and 33 percent ash and had a specific gravity of 1.25, such as Naugatuck Reclaimed Rubber No. 662.

|  | 7 | 8 | 9 |
|---|---|---|---|
| Parts by weight of zinc resinate per 100 parts by weight of rubber | 125 | 150 | 175 |
| Ingredients, parts by weight: | | | |
| Reclaim rubber | 17.50 | 16.39 | 15.52 |
| Zinc salt of formaldehyde-modified rosin (Ex. A) | 21.88 | 24.69 | 27.17 |
| Filler: | | | |
| Kaolin clay (s.g. 2.6-300 mesh) such as Dixie Clay | 8.79 | 8.23 | 7.70 |
| Precipitated calcium carbonate, fine particle size, such as Calcene TM | 8.79 | 8.23 | 7.70 |
| Asbestos Fiber, such as Asbestos 7T06 | 8.79 | 8.23 | 7.70 |
| Rubber antioxidant: phenyl beta napthylamine | 0.25 | 0.24 | 0.23 |
| Rubber vehicle: | | | |
| Toluene | 15.30 | 15.30 | 15.30 |
| n-Hexane | 18.70 | 18.70 | 18.70 |

In preparing the formulations 7, 8 and 9, the mixer is heated to 230° F. After reaching temperature, the reclaim rubber is added and allowed to masticate for 15 minutes, first at 33 then later at 84 r.p.m. Next the zinc resinate is added. After 15 minutes of mixing, the mill is cooled to 190° F. The speed of the mill then is reduced to 50 r.p.m. and the clay filler added slowly. After 15 minutes mixing, the mill is cooled to 175° F.; the mill speed reduced to 33 r.p.m. and the calcium carbonate filler and the rubber antioxidant are added slowly to the batch. After 5 minutes mixing, the toluene is added slowly over an 8–10 minute period. The mill is cooled to 100° F., at which time the asbestos filler is added. After 10 minutes of mixing, the n-hexane is added slowly. Mill speed then is increased to 50 r.p.m.; and upon completion of solvent addition the composition is allowed to mix for an additional 5 minutes. At this time a small sample of the batch is taken and a solids determination is made rapidly thereof. Additional rubber vehicle then is added, if necessary, to provide a formulation approximating 66 percent solids content.

To illustrate utility of and advantageous properties exhibited by the foregoing illustrative embodiments of mastic adhesive compositions of the invention, they are utilized to adhere plywood surfaces together and a number of physical properties thereof are determined. For comparison, there also are prepared in a like manner the same formulations except that an equal amount by weight of WW wood rosin or a pentaerythritol ester of hydrogenated rosin, such as Pentalyn H of Hercules Powder Company, replaces the zinc resinate component thereof.

The following Tables I through V present illustrative physical property data from employing a number of the foregoing embodiments of the invention along with corresponding data from employing a comparison formulation. In preparing adhered specimens for data determination, mastic composition is applied by a ⅛ x ½ x ⅛ inch notched-trowel to a surface of each of two fir (Grade AB) plywood blocks in a manner to provide a crosshatch of material when the plywood blocks are assembled. These plywood blocks before application of mastic composition were stored for two weeks at 73° F. under a relative humidity of fifty percent. For lap-shear strength determinations, an area of 2 x 1½ inch on each of two 2 x 1¾ x ¾ inch blocks is coated and two blocks assembled during the open time of the mastic composition; following which a 500-g. weight is set on the assembled blocks for 30 minutes before exposing the assembled blocks for 2 weeks at 73° F. and a relative humidity of 50 percent; and then determining their lap-shear strength. Lap-sheer strength determinations are as outlined in ASTM Method D905–49 except that the Instrom rate is 0.5 inch per minute and the number of test specimens for each composition is two. For lap-shear strength after aging, correspondingly prepared specimens immediately after assembly are stored in an oven for two weeks at 70° C. For resistance to embrittlement after aging determinations, data obtainable during lap-shear strength determinations are used. With chart speed set at the same rate as jaw speed, values measured in inches along the base of each bond-strength curve are a measure of the elongation or deformation of the mastic while being sheared apart during the lap-shear strength test. In resistance to static load determinations, a 1 inch² area of each of two 1 x 5 x ¼-inch blocks is coated with the mastic composition; two blocks are assembled during the open time of the mastic; following which a 500-g. weight is set on the assembled blocks for 30 minutes; and then the assembled blocks are conditioned for 2 weeks at 73° F. and a relative humidity of 50 percent before testing. In testing the specimens are hung vertically in a forced-air oven at 160° F., and a 500-g. weight attached to the bottom of the 9-inch long assembled specimens. For green-tack strength determinations, corresponding specimens are prepared and their adhered strengths determined following their assembly and following their having a 500-g. weight set on them for thirty seconds. In open time determinations, the mastic composition is applied lengthwise onto two 1 x 5 x ¼-inch plywood blocks and then brought together with the mastic sides facing in cross-lap fashion at various time intervals up to a time interval at which it was observed that the applied mastic compositions had no tack. The time just before that at which no tack is observed is recorded as open time.

TABLE I.—LAP-SHEAR STRENGTH

| | Conc., phr.[a] | Adhesion, p.s.i. | |
|---|---|---|---|
| | | Before aging | After aging 2 wks. at 158° F. |
| Natural rubber: | | | |
| Control | 150 | 69 | 41 |
| Do | 175 | 76 | 63 |
| Do | 200 | 103 | 80 |
| Form. 1 | 150 | 80 | 47 |
| Form. 2 | 175 | 109 | 99 |
| Form. 3 | 200 | 190 | 167 |
| SBR rubber: | | | |
| Control | 125 | 168 | 243 |
| Do | 150 | 108 | 176 |
| Do | 175 | 86 | 225 |
| Form. 4 | 125 | 109 | 194 |
| Form. 5 | 150 | 117 | 216 |
| Form. 6 | 175 | 145 | 240 |
| Reclaim rubber: | | | |
| Control | 125 | 101 | 160 |
| Do | 150 | 96 | 164 |
| Do | 175 | 104 | >158 |
| Form. 7 | 125 | 157 | 218 |
| Form. 8 | 150 | 219 | 174 |
| Form. 9 | 175 | 172 | 160 |

[a] Indicates parts per hundred by weight, based on the rubber, of the amount of WW gum rosin in the controls and of zinc salt of formaldehyde-modified rosin in the numbered formulations.

TABLE II.—EMBRITTLEMENT AS PERCENT DEFORMATION

| | Conc., phr.[a] | Percent deformation[b] |
|---|---|---|
| Natural rubber: | | |
| Control | 150 | 24.7 |
| Do | 175 | 14.1 |
| Do | 200 | 50.4 |
| Form. 1 | 150 | 87.5 |
| Form. 2 | 175 | 53.2 |
| Form. 3 | 200 | 66.7 |
| SBR rubber: | | |
| Control | 125 | 56.1 |
| Do | 150 | 40.8 |
| Do | 175 | 36.5 |
| Form. 4 | 125 | 51.4 |
| Form. 5 | 150 | 43.2 |
| Form. 6 | 175 | 33.2 |
| Reclaim rubber: | | |
| Control | 125 | 31.2 |
| Do | 150 | 31.7 |
| Do | 175 | 55.9 |
| Form. 7 | 125 | 134.6 |
| Form. 8 | 150 | 61.7 |
| Form. 9 | 175 | 30.0 |

[a] Indicates parts per hundred by weight, based on the rubber, of the amount of WW gum rosin in the controls and of zinc salt of formaldehyde-modified rosin in the numbered formulations.
[b] Percent deformation is calculated by dividing the average elongation (in inches) of specimens aged at room temperature (2 weeks at 73° F.) into the average elongation value (in inches) of specimens aged 2 weeks at 158° F. and then multiplying by one hundred.

TABLE III.—RESISTANCE TO STATIC LOAD AT ELEVATED TEMPERATURE

| | Conc., phr.[a] | Hours, time[b] |
|---|---|---|
| Natural rubber: | | |
| Control | 150 | >24 |
| Do | 175 | ~16 |
| Do | 200 | ~14 |
| Form. 1 | 150 | >24 |
| Form. 2 | 175 | ~15 |
| Form. 3 | 200 | ~13 |
| SBR rubber: | | |
| Control | 125 | ~20 |
| Do | 150 | >24 |
| Do | 175 | ~14 |
| Form. 4 | 125 | >24 |
| Form. 5 | 150 | >24 |
| Form. 6 | 175 | >24 |
| Reclaim rubber: | | |
| Control | 125 | 1.1 |
| Do | 150 | 0.6 |
| Do | 175 | 0.3 |
| Form. 7 | 125 | 0.3 |
| Form. 8 | 150 | 0.3 |
| Form. 9 | 175 | 0.2 |

[a] Indicates parts per hundred by weight, based on the rubber, of the amount of WW gum rosin in the controls and of zinc salt of formaldehyde-modified rosin in the numbered formulations.
[b] Time to failure at 160° F. with load of 500 grams per square inch area of lap joint.

TABLE IV.—OPEN TIME

| | Conc., phr.[a] | Time, min.[b] |
|---|---|---|
| Natural rubber: | | |
| Control | 150 | 0 |
| Do | 175 | 3 |
| Do | 200 | 5 |
| Form. 1 | 150 | 15 |
| Form. 2 | 175 | 25 |
| Form. 3 | 200 | 45 |
| SBR rubber: | | |
| Control | 125 | 25 |
| Do | 150 | 25 |
| Do | 175 | 25 |
| Form. 4 | 125 | 7 |
| Form. 5 | 150 | 15 |
| Form. 6 | 175 | 30 |
| Reclaim rubber: | | |
| Control | 125 | 30 |
| Do | 150 | 30 |
| Do | 175 | 45 |
| Form. 7 | 125 | 30 |
| Form. 8 | 150 | 30 |
| Form. 9 | 175 | 30 |

[a] Indicates parts per hundred by weight, based on the rubber, of the amount of pentaerythritol ester of hydrogenated rosin in the controls and of zinc salt of formaldehyde-modified rosin in the numbered formulations.
[b] The useful time interval between the spreading of the mastic composition on the adherend and the completion of the mating of the parts for bonding wherein the spread mastic composition has useful tack. Just beyond the recorded time interval the applied composition no longer has adequate green tack for adhesive purposes.

TABLE V.—GREEN-TACK STRENGTH

| | Conc., phr.[a] | Adhesion, p.s.i.[b] |
|---|---|---|
| Natural rubber: | | |
| Control | 150 | 0.8 |
| Do | 175 | 1.0 |
| Do | 200 | 0.9 |
| Form. 1 | 150 | 1.7 |
| Form. 2 | 175 | 2.2 |
| Form. 3 | 200 | 1.6 |
| SBR rubber: | | |
| Control | 125 | 1.0 |
| Do | 150 | 0.7 |
| Do | 175 | 0.9 |
| Form. 4 | 125 | 0.5 |
| Form. 5 | 150 | 0.8 |
| Form. 6 | 175 | 1.0 |
| Reclaim rubber: | | |
| Control | 125 | 1.2 |
| Do | 150 | 1.4 |
| Do | 175 | 1.1 |
| Form. 7 | 125 | 1.2 |
| Form. 8 | 150 | 1.8 |
| Form. 9 | 175 | 0.5 |

[a] Indicates parts per hundred by weight, based on the rubber, of the amount of pentaerythritol ester of hydrogenated rosin in the controls and of zinc salt of formaldehyde-modified rosin in the numbered formulations.
[b] Tack of composition shortly after troweling on plywood surfaces and before expiration of the open time interval whereafter the applied composition no longer has significant green tack.

We claim:
1. A mastic adhesive composition consisting essentially of relative proportions by weight of:
   (a) 100 parts of a rubber selected from the group consisting of natural, styrene-butadiene, and reclaim rubbers;
   (b) 50 to 200 parts of zinc resinate which is the salt of 5 to 10 parts of zinc and the reaction product of 100 parts molten rosin with 2 to 10 parts of formaldehyde; and
   (c) a hydrocarbon vehicle in an amount dispersing said rubber and providing the mastic adhesive composition with a solids content between 40 and 80 percent.
2. The composition of claim 1 which also includes a rubber antioxidant and from 150 to 400 parts of inorganic filler.
3. The composition of claim 2 wherein the rubber is natural rubber.
4. The composition of claim 2 wherein the rubber is styrene-butadiene rubber.
5. The composition of claim 2 wherein the rubber is reclaim rubber.

References Cited
UNITED STATES PATENTS
2,610,162   9/1952   Hoffman _____ 260—27 BB
2,572,071   10/1951  St. Clair et al. _____ 260—105

OTHER REFERENCES
Berry et al.: American Chemical Society 157th Meeting, April 1969, pp. 264–277.

SAMUEL H. BLECH, Primary Examiner

U.S. Cl. X.R.

260—27 BB, 105, 732, 755; 161—244, 250